United States Patent
Salerno

(10) Patent No.: US 6,246,184 B1
(45) Date of Patent: Jun. 12, 2001

(54) FLASHLIGHT BOOST REGULATOR

(75) Inventor: David C. Salerno, New Boston, NH (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/366,148

(22) Filed: Aug. 3, 1999

(51) Int. Cl.[7] .................................................. G05F 1/00
(52) U.S. Cl. ...................... 315/291; 315/297; 315/200 A
(58) Field of Search .................. 315/291, 297, 315/298, 306, 307, 308, 310, 200 A; 362/154, 155, 171, 157, 208

(56) References Cited

U.S. PATENT DOCUMENTS

| | | | |
|---|---|---|---|
| 3,800,136 | 3/1974 | Edelson | 240/10.6 |
| 4,156,166 | 5/1979 | Shapiro et al. | 315/209 |
| 4,228,485 | 10/1980 | Hubbard et al. | 362/191 |
| 4,326,161 | 4/1982 | Kreinberg | 323/299 |
| 4,395,138 | 7/1983 | Chihara | 368/204 |
| 4,404,624 | 9/1983 | Yamazaki | 363/59 |
| 4,460,863 | 7/1984 | Conforti | 320/59 |
| 4,499,525 | 2/1985 | Mallory | 362/157 |
| 4,887,006 | 12/1989 | Kuratani | 315/209 |
| 4,972,394 | 11/1990 | DiMarco | 368/227 |
| 5,144,207 | * 9/1992 | Brunson | 315/291 |
| 5,214,353 | 5/1993 | Nilssen | 315/33 |
| 5,357,411 | 10/1994 | Menke et al. | 362/183 |
| 5,418,433 | 5/1995 | Nilssen | 315/175 |
| 5,430,641 | * 7/1995 | Kates | 363/133 |
| 5,498,934 | 3/1996 | Nilssen | 315/224 |
| 5,530,632 | * 6/1996 | Shikano et al. | 362/109 |
| 5,684,370 | 11/1997 | Watanabe | 318/151 |
| 5,839,821 | * 11/1998 | LeZotte | 362/253 |
| 5,859,506 | * 1/1999 | Lemke | 315/308 |
| 5,912,552 | * 6/1999 | Tateishi | 323/285 |

* cited by examiner

*Primary Examiner*—David Vu
*Assistant Examiner*—Ephrem Alemu
(74) *Attorney, Agent, or Firm*—W. Daniel Swayze, Jr.; W. James Brady; Frederick J. Telecky, Jr.

(57) ABSTRACT

A boost regulator circuit is designed to maintain nearly constant intensity from a flashlight lamp, compensating for the drop in battery voltage over an operating lifetime. The quality of the light output is improved, and battery life is extended. An asynchronous boost regulator circuit and two synchronous boost regulator circuits are shown. The regulator circuit begins boosting after battery voltage has fallen by 15–20%, and maintains output voltage at a substantially constant level until a major portion of the stored battery energy has been consumed. A circuit assembly is shown that can be used to retrofit existing flashlights. The circuit assembly resides on a disk-shaped circuit board that can be placed between the lamp and an adjacent battery. Contacts formed on the circuit board provide connections to the battery, the lamp, and to a common connection point such as ground.

11 Claims, 6 Drawing Sheets

FLASHLIGHT BOOST REGULATOR

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to the field of portable light sources, such as flashlights.

The light output from a typical incandescent lamp of the type used in portable light sources is very sensitive to the voltage applied to the lamp. It has been determined that light output intensity changes in proportion to the voltage raised to the power of 3.5. Additionally, the voltage supplied by a typical dry cell battery, such as an alkaline battery, diminishes steadily throughout its operating lifetime. Consequently, the light output from a flashlight tends to become quite dim relatively early in the operating lifetime of the batteries. At this point the user must choose whether to continue using the same batteries, suffering the reduced light output for a significant period of operating time, or to replace the batteries to obtain better light output. The latter option increases the cost of operating the flashlight.

There are several known techniques for addressing the general problem of improving flashlight performance and/or efficiency. U.S. Pat. Nos. 5,498,934 and 5,418,433 to Nilssen, for example, show flashlights in which a BOOST switch and associated circuitry are used to temporarily increase light output by up to 300%. This feature can be used to obtain a markedly increased light output for very brief periods, as may be required by a user. However, the technique does not address the problem of maintaining consistent high-quality light output as batteries age.

U.S. Pat. No. 4,949,014 to Gasvoda, U.S. Pat. No. 4,499,525 to Mallory and U.S. Pat. No. 4,326,161 to Kreinberg show-battery-powered lamps in which the lamp intensity is regulated to be substantially constant despite the diminishing of battery voltage over an operating lifetime. In all of these lamps, the nominal battery voltage is substantially greater than the voltage required to obtain the desired light intensity. The lamp intensity is regulated by varying the duty cycle of an electronic switch inserted in series between the batteries and the lamp. The slow response time of the lamp element is exploited to integrate the energy pulses. These devices require relatively high-voltage batteries, and the lifetime of the lamps may be reduced due to the direct application of high-amplitude rectangular ripple currents to the lamps.

BRIEF SUMMARY OF THE INVENTION

In accordance with the present invention, a light source is disclosed from which a substantially constant and full-intensity light output can be obtained despite the diminishing of battery voltage. A relatively small number of low-voltage cells can be used, enhancing portability. In one embodiment a standard flashlight can be retrofitted to obtain the enhanced performance associated with the invention.

The disclosed light source includes a lamp having a rated operating voltage, and one or more series-connected batteries collectively operative to provide electrical power to the lamp. The battery voltage generally diminishes during the operating lifetime of the batteries from an initial battery voltage substantially equal to the rated operating voltage of the lamp toward zero volts. A boost regulator circuit is coupled to transfer electrical power from the batteries to the lamp. The boost regulator circuit automatically maintains substantially the rated operating voltage to the lamp as the battery voltage diminishes, such that a major portion of the original battery energy is used in providing substantially constant and full output light intensity from the light source. Three different boost regulator circuits are disclosed, having different characteristics making them suitable for different customer requirements.

The light source includes a circuit assembly having the regulator circuit disposed on a planar circuit board. The circuit board is shaped to be disposed within the case of the light source between the lamp and one of the batteries. In one embodiment, the circuit board is in the shape of a disk, and is disposed within a cylindrical body of a light source. The circuit board includes electrical contacts on opposite planar surfaces to make electrical contact with the battery and the lamp. The circuit board also includes one or more common electrical contacts to be connected to a common connection in the light source between the batteries and the lamp. In one embodiment, the common electrical contact is a flexible contact extending from an edge of the circuit board to contact a common connection extending alongside the lamp and the adjacent battery.

Other aspects, features, and advantages of the present invention are disclosed in the detailed description that follows.

DETAILED DESCRIPTION OF THE INVENTION

Figure 1:
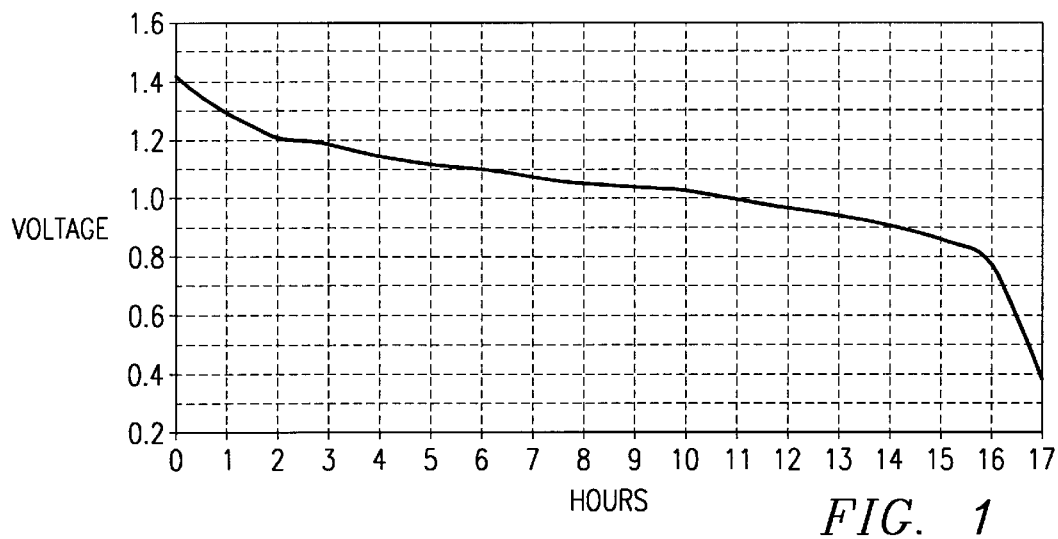
FIG. 1 is a plot of output voltage as a function of time for a typical 1.5-volt alkaline cell at a constant discharge current of 500 mA.

FIG. 1 illustrates how the voltage of a typical alkaline cell diminishes as the cell discharges over time. The plot of FIG.

1 assumes a constant discharge current of 500 mA. The plot shows an overall drop in cell voltage from about 1.5 volts to about 0.4 volts over 17 hours. The cell voltage drops from 1.5 volts to 1.2 volts over the first 2 hours, then drops steadily from 1.2 volts to about 0.8 volts over the next 14 hours, and finally drops very quickly toward zero over the last hour.

Figure 2:
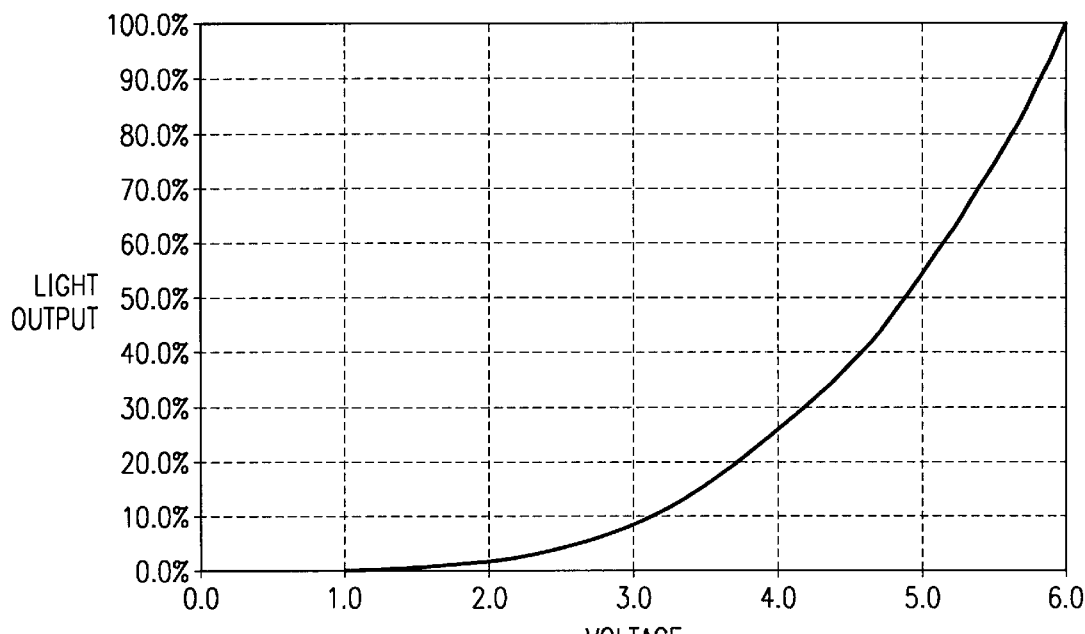
FIG. 2 is a plot of output light intensity as a function of applied voltage for a typical 6-volt xenon flashlight lamp.

FIG. 2 illustrates the light output intensity of a typical 6-volt xenon lamp as a function of input voltage, normalized to the light output intensity at the rated voltage of 6 volts. This plot illustrates the considerable sensitivity of the output light intensity to applied voltage. A reduction of input voltage by a factor of 0.2 (e.g., from 5.0 volts to 4.0 volts) causes a reduction in output light intensity of 0.5. This plot thus highlights the significance of the battery discharge characteristic shown in FIG. 1. Assuming a set of 4 series-connected 1.5 volt cells driving a 6 volt xenon lamp, the output light intensity drops to 50% of maximum very early in the life of the cells. When each cell is at 1 volt, and a significant amount of battery life remains, the output light intensity is only 25% of maximum. A user must choose between diminished lighting ability, with attendant frustration and risks, and premature replacement of the batteries, with attendant inefficiency and costs.

Figure 3:
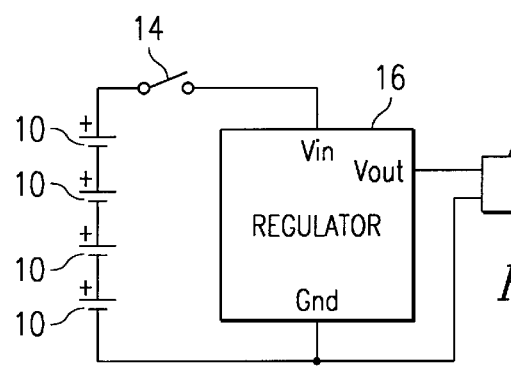
FIG. 3 is a block diagram of a flashlight incorporating a boost regulator circuit in accordance with the present invention.

FIG. 3 shows a general block diagram of a flashlight or similar portable light source designed to make more efficient use of batteries while maintaining consistent high output light intensity throughout the life of the batteries. The flashlight includes one or more cells 10, a lamp 12, an on/off switch 14 and a regulator circuit 16. The regulator circuit 16 is a boost regulator designed to produce a constant output voltage Vout from an input voltage Vin that is variable and is generally less than the voltage Vout. In one embodiment, the lamp 12 has a rated operating voltage of 6 volts, and the cells 10 are 1.5 volt dry cells such as alkaline cells.

Figure 4:
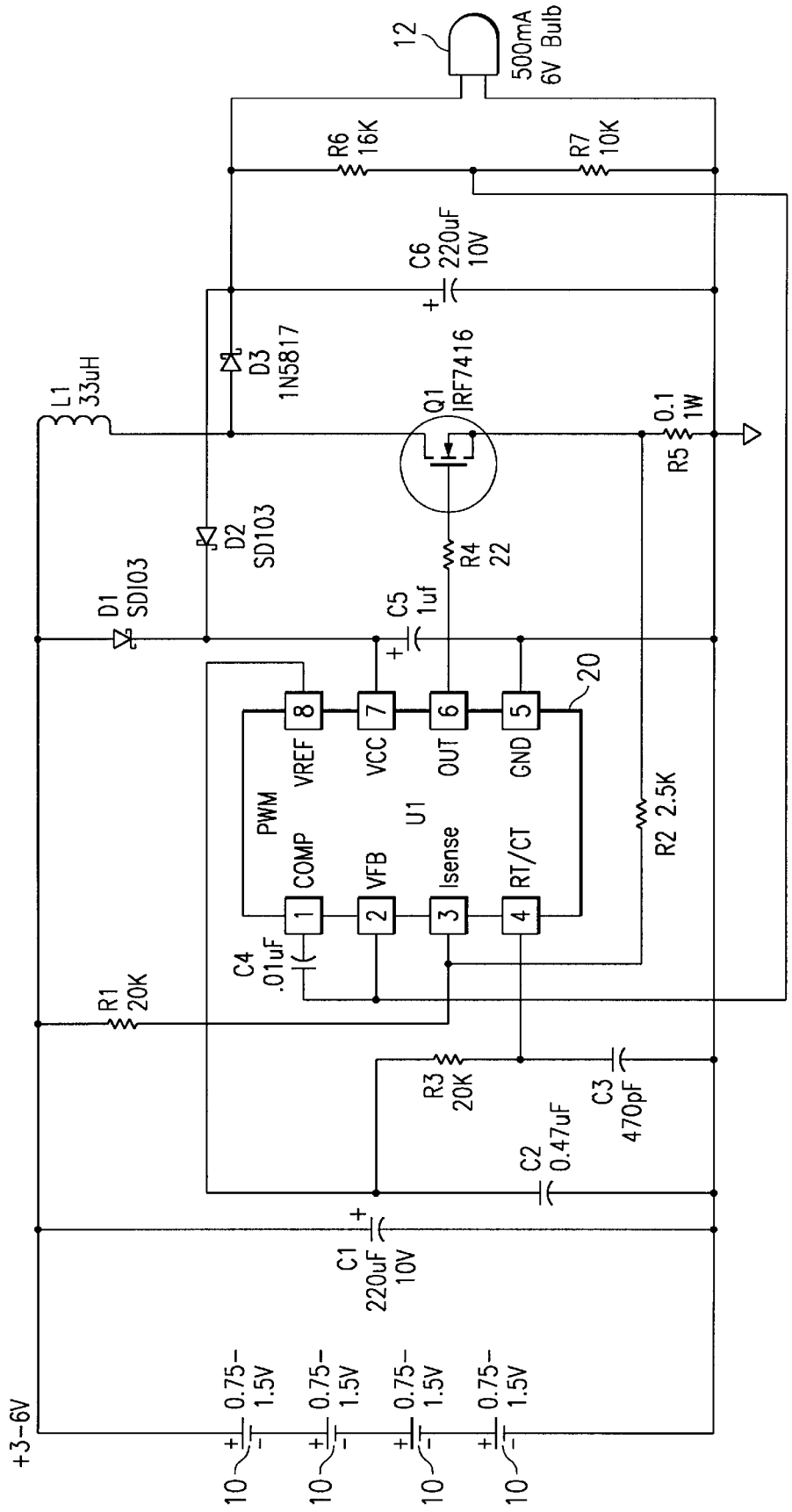
FIG. 4 is a schematic diagram of the flashlight of FIG. 3 using a first type of boost regulator circuit.

FIG. 4 shows a circuit implementation of the general configuration of FIG. 3. The circuit includes a pulse-width modulator (PWM) circuit 20, such as a UCC3805 PWM from Unitrode Corporation. A coil L1 is connected in series with the cells 10. An N-channel field-effect transistor (NFET) Q1 is connected between the coil L1 and ground, and a diode D3 is connected between the coil and one side of the lamp 12. The PWM 20 drives the gate of the NFET Q1 with a pulse train to cause the NFET Q1 to alternate between conducting and non-conducting states. When the NFET Q1 is conducting, current flows through the coil L1, causing the buildup of magnetic flux. The Q1–L1 combination is isolated from the output by the diode D3. When the NFET Q1 subsequently turns OFF, the release of flux from the coil L1 forces current to flow through diode D3 to charge capacitor C6, maintaining the voltage across the lamp 12. The diode D3 acts as an asynchronous rectifying output switch for the pulse current.

The regulator circuit of FIG. 4 employs an outer voltage control loop and an inner current control loop. The voltage control loop samples the output voltage via a resistive divider R6 and R7, and creates a current command signal within the PWM 20 in response to the difference between the sampled output voltage and a voltage reference internal to the PWM 20. The current control loop samples the output current via a sense resistor R5, and establishes the duty cycle of the Q1 gate drive signal in response to the difference between the sampled output current and the current command signal created by the voltage control loop. This duty cycle ranges from a minimum of zero (when the battery voltage is high enough to drive the lamp 12 through the diode D3) to a maximum of 50% (when the battery voltage has fallen to about half of its initial value). The 50% limit is imposed by the PWM 20 in order to maintain stable operation. Once the duty cycle limit is reached, regulation is no longer maintained, and the output voltage falls fairly precipitously as the battery voltage continues to diminish.

The circuit of FIG. 4 has a few additional noteworthy features. The PWM 20 is capable of "bootstrapping" operation, which enables it to build up gate drive voltage for the NFET Q1 to maintain low NFET ON resistance even at low operating voltages. Steering diodes D1 and D2 assist with bootstrapping operation. The gate drive voltage is initially generated from the battery voltage via the diode D1 and the VCC pin. When the lamp voltage is high enough, the VCC pin is supplied with current via diode D2 instead. Efficiency is enhanced by using the greatest possible gate drive voltage. Other features of the circuit of FIG. 4 include delaying switching regulation until the battery voltage has diminished slightly, and ceasing regulation once battery voltage decays to below a predetermined value. These operations are illustrated in FIGS. 6 and 7, discussed below.

The circuit of FIG. 4 also includes capacitors C1–C5 and resistors R1–R5.

Figure 5:
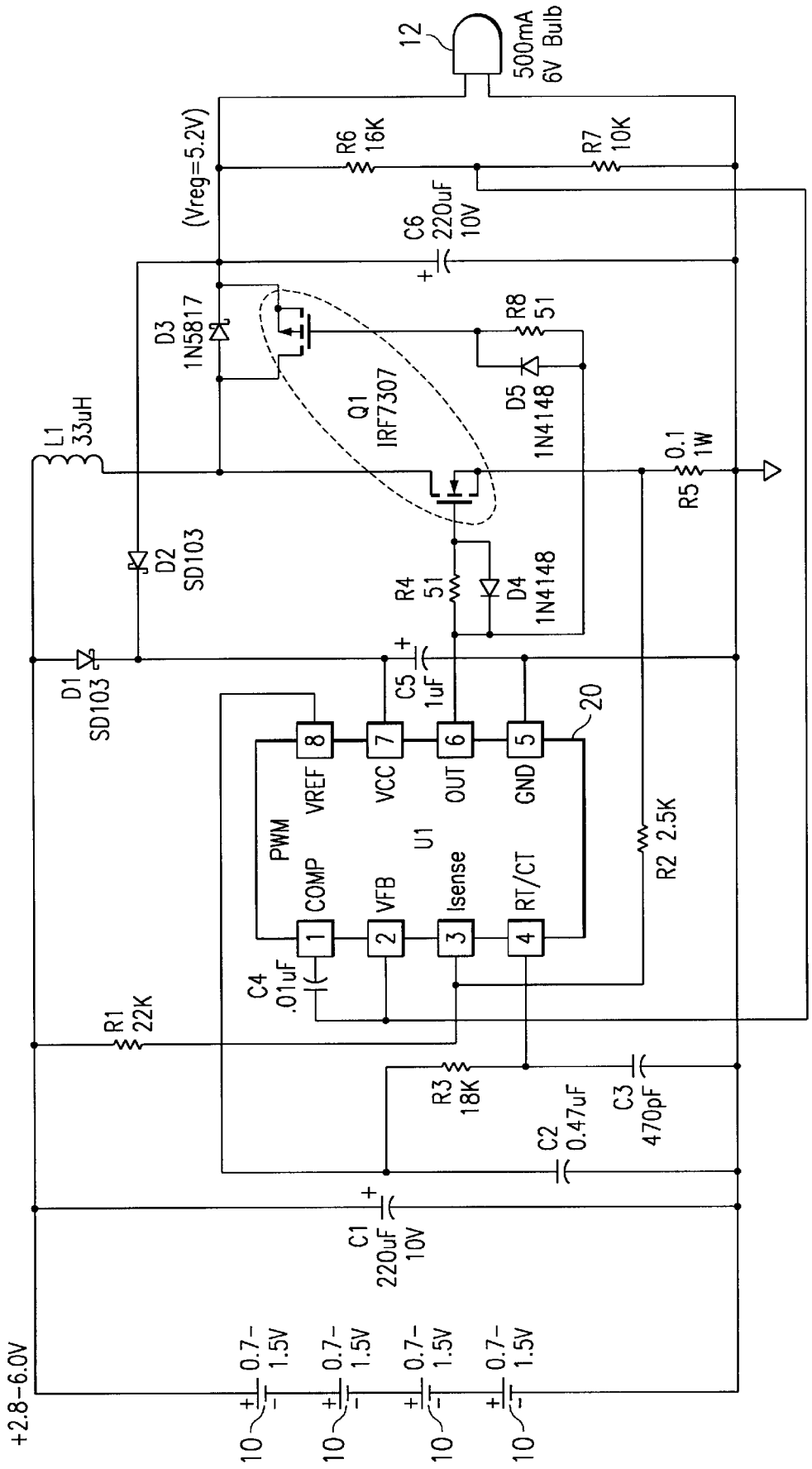
FIG. 5 is a schematic diagram of the flashlight of FIG. 3 using a second type of boost regulator circuit.

FIG. 5 shows an alternative embodiment in which the regulator circuit employs so-called synchronous rectification. This circuit is similar to that of FIG. 4. All of the elements R1–R7, C1–C6, L1, and D1–D3 are identical or similar to their counterparts in the circuit of FIG. 3. One major difference from the circuit of FIG. 4 is the use of a Pchannel FET (PFET) output switch to transfer current between the coil L1 and the capacitor C6. Also, this circuit includes diodes D4 and D5 and resistor R8. As shown, the NFET charging transistor and the PFET discharging transistor are included in a single package Q1. The PFET and NFET are driven by the same gate drive signal. When the gate drive signal is driven high towards the supply voltage, the NFET is conducting and the PFET is OFF. When the gate drive signal is driven low towards ground, the PFET is conducting and the NFET is OFF. Various benefits are obtained using synchronous rectification, including improved efficiency resulting from the use of a transistor rather than a diode to steer current from the coil L1 to the output.

Figure 6:
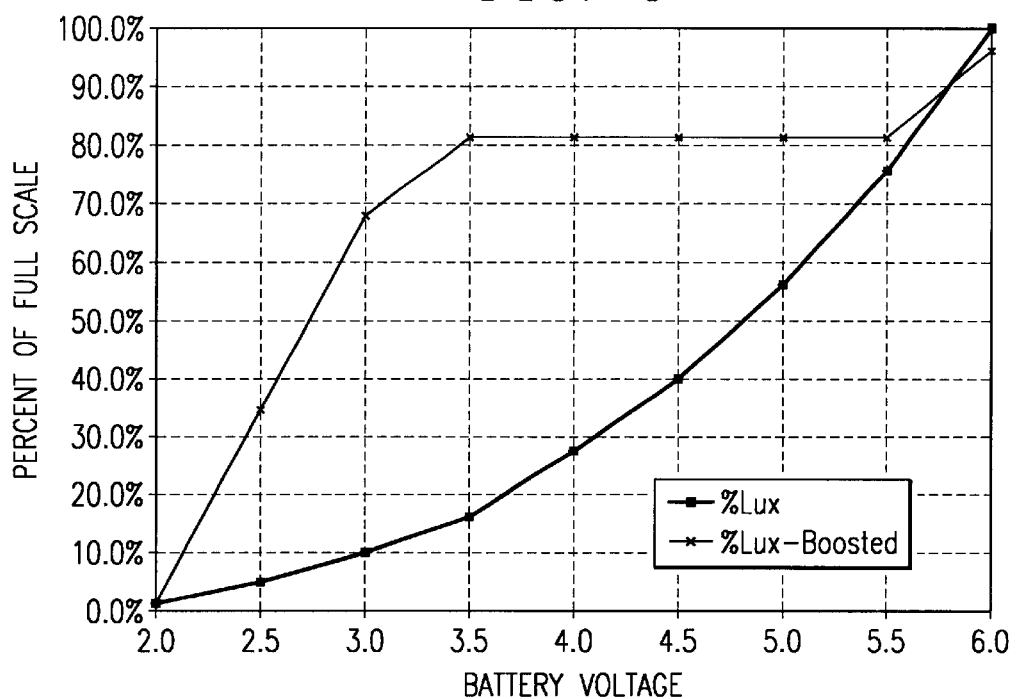
FIG. 6 is a plot of output light intensity as a function of battery voltage in a flashlight with and without the use of a boost regulator circuit.
Figure 7:
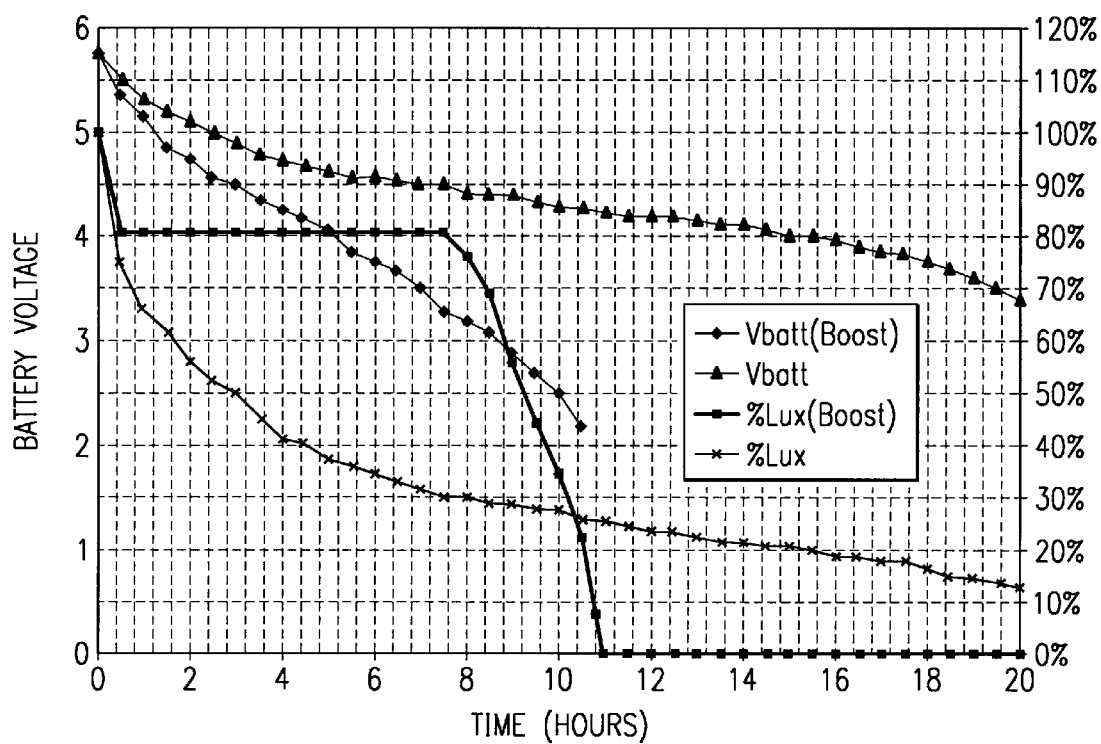
FIG. 7 is a plot showing both battery voltage and output light intensity as a function of time in a flashlight with and without the use of a boost regulator.

FIG. 6 shows light output as a function of battery voltage for a flashlight like those shown in FIGS. 4–5, contrasted with the same plot for a typical prior art flashlight. The circuits of FIGS. 4 and 5 maintain a relatively high and stable light output intensity for battery voltages ranging from 6.0 volts down to about 3 volts. This is in contrast to a typical prior art flashlight, in which the light output intensity falls 90% over the same range of battery voltages.

FIG. 7 shows plots of battery voltage (Vbatt) and light output intensity (% Lux) as a function of time for a flashlight like those shown in FIGS. 4–5, again contrasted with the corresponding waveforms for a prior art flashlight. In the prior art flashlight, light output intensity has fallen to 50% of maximum after only 3 hours of use. If the batteries are replaced at this point, only about ⅓ of their total stored energy has been used. In the circuits employing a boost converter, light intensity is maintained at 80% of maximum for approximately 8 hours of use, and approximately 80% of the energy stored in the batteries has been used before the light output diminishes considerably. Thus, FIG. 7 highlights the marked improvements in performance (light intensity) and efficiency (more complete use of stored battery energy) that can be obtained by employing the present invention.

FIGS. 6 and 7 show that boosting operation begins only after the battery voltage has decayed to about 80% of its maximum value. This feature reflects a tradeoff between battery life and regulated light output intensity, with lower thresholds generally yielding longer battery life and diminished regulated light output intensity. It may be desirable in alternative embodiments to employ a different threshold to achieve a different compromise. It may also be desirable that the threshold value be user-adjustable in alternative embodiments, to provide the best match between performance and a user's needs.

As also reflected in FIGS. 6 and 7, regulation ceases once the battery voltage has fallen to less than about 3.5 volts. This feature serves two purposes: to relieve the load on the battery as it becomes depleted, and to alert the user that the end of battery life is approaching. This threshold can be different values in alternative embodiments, and also may be user-adjustable.

Figure 8:
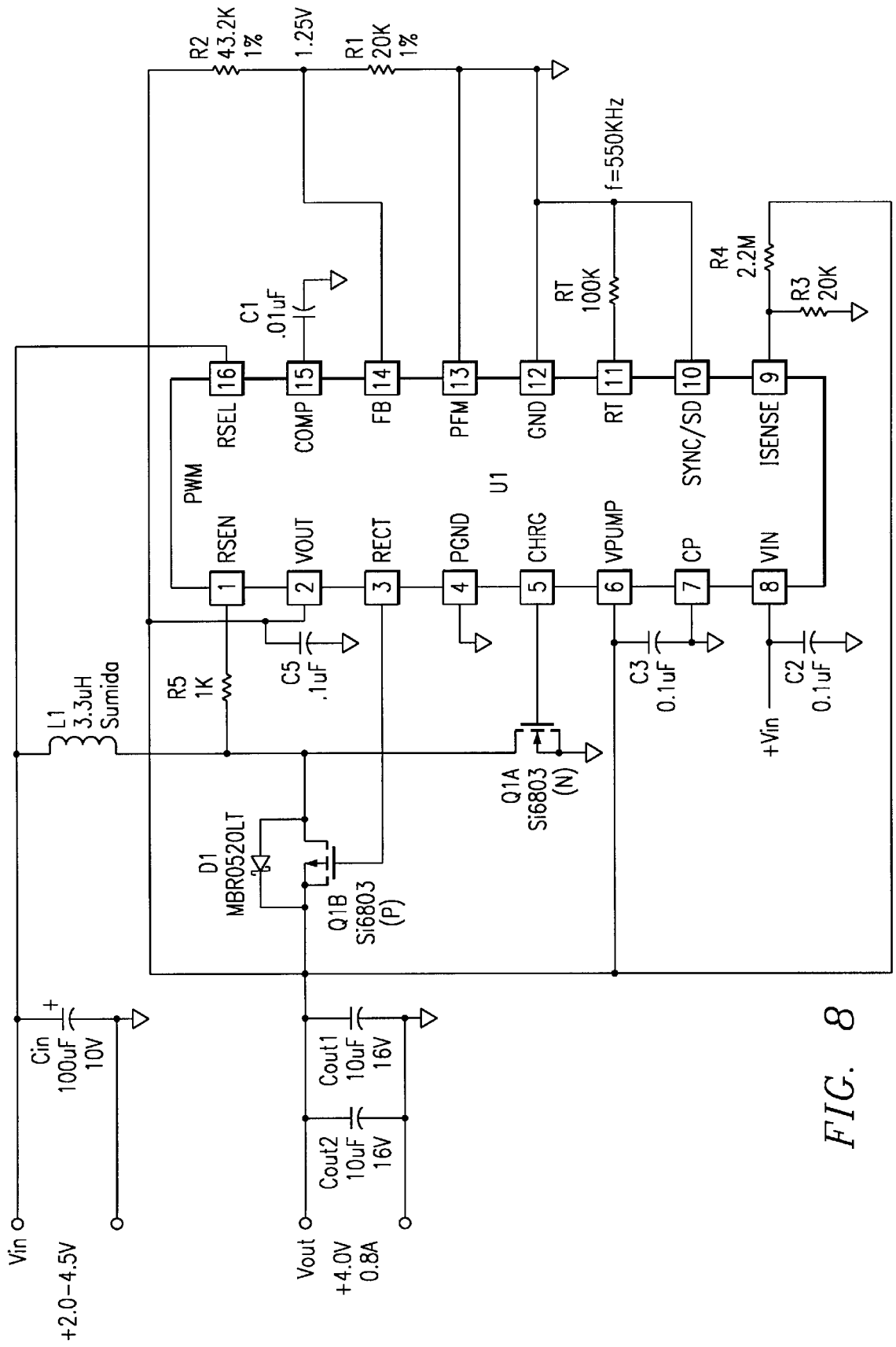
FIG. 8 is a schematic diagram of a third type of boost regulator circuit that may be used in the flashlight of FIG. 3.

FIG. 8 shows a third type of regulator circuit that may be employed. This circuit uses a different boost converter integrated circuit U1, which is the UCC39421 from Unitrode Corporation. The UCC39421 is a newer PWM IC that incorporates additional features to reduce the amount of off-chip circuitry needed for applications. The circuit of FIG. 8 operates in generally the same manner as the circuits of FIGS. 4 and 5, although the circuit of FIG. 8 is intended for use with 3 cells and a 4.0 volt lamp, rather than the 4 cells and 6.0 volt lamp of the circuits of FIGS. 4 and 5. The circuit of FIG. 8 includes capacitors Cin, Cout1, Cout2, and C1–C5, inductor L1, resistors RT and R1–R5, diode D1, and transistors Q1A and Q1B.

Figure 9:
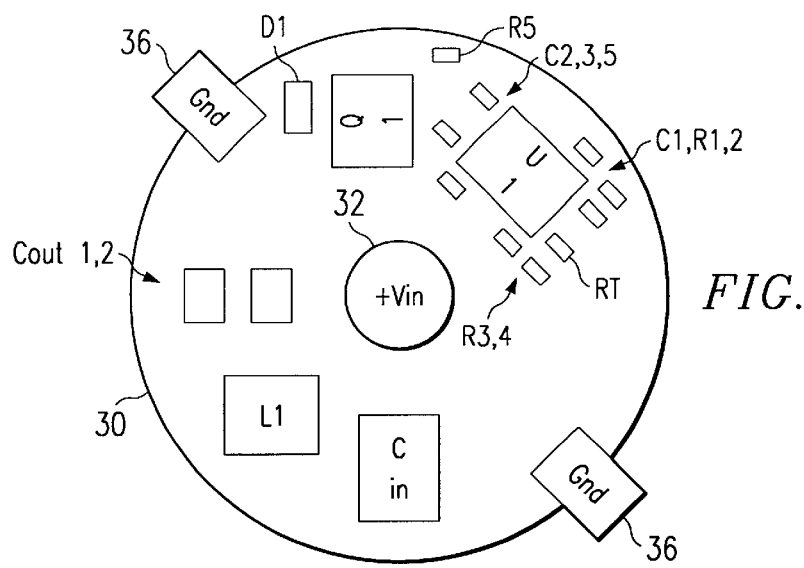
FIG. 9 is a layout diagram of a circuit assembly having a boost regulator circuit that can be incorporated into a typical flashlight.
Figure 10:
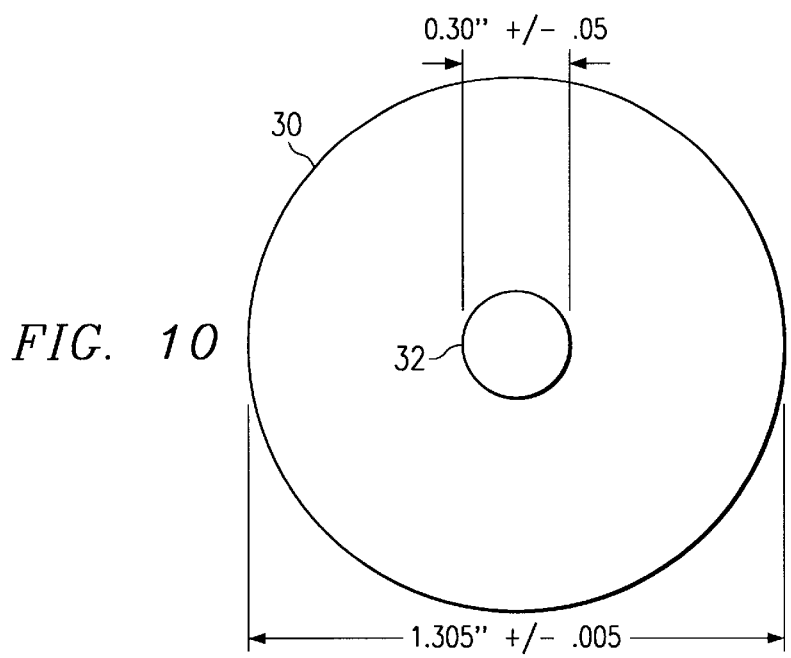
FIG. 10 is a plan view of a disk-shaped printed circuit board used in the circuit assembly of FIG. 9.
Figure 11:
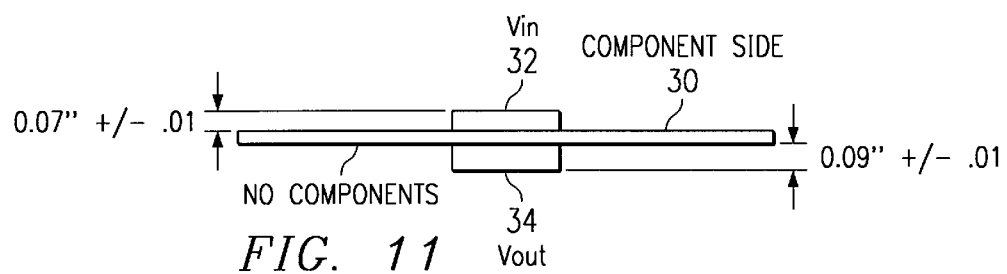
FIG. 11 is an elevation view the printed circuit board of FIG. 10.

FIGS. 9–11 show a physical implementation of the regulator circuit of FIG. 8 that is suitable for retrofitting a typical existing flashlight having a cylindrical case. A printed circuit board 30 is formed in the shape of a disk approximately 1.3" in diameter, which is equal to the diameter of a "D" cell. The various components shown in the circuit of FIG. 8 are arranged on one surface of the board 30, as shown in FIG. 9. For example, components Q1, L1, Cin, U1, RT, C1–C5 and R1–R5 are arranged as shown. Raised contacts 32 and 34 provide connections for Vin and Vout. Flexible ground contacts 36 extend in tab-like fashion from the edges of the board 30. The illustrated circuit assembly is to be placed between the lamp and the battery adjacent to the lamp within the flashlight case. Thus, the Vout connection is made directly to the center contact of the lamp, and the Vin connection is made directly to the center contact of the adjacent battery. It is assumed that the flashlight case itself or an inner conductive shell provides a ground or common connection, to which the bottommost battery and the lamp are also connected. The flexible ground contacts 36 contact the case or conductive shell to provide the ground reference for the regulator circuit. Of course, in alternative embodiments the ground connection may be made differently. For example, it may be desirable to employ flexible connections directly between ground contacts on the board 30 and the back of the lamp. Other configurations are also possible.

A light source employing a boost regulator has been described. It will be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. A light source, comprising:
   a lamp having a rated operating voltage;
   one or more series-connected batteries collectively operative to provide electrical power at a battery voltage, the battery voltage generally diminishing during the operating lifetime of the batteries from an initial battery voltage substantially equal to the rated operating voltage of the lamp toward zero volts; and
   a boost regulator circuit coupled to transfer electrical power from the batteries to the lamp, the boost regulator circuit being operative to automatically maintain substantially the rated operating voltage to the lamp as the battery voltage diminishes, such that a major portion of the original battery energy is used in providing substantially constant and full output light intensity from the light source.

2. A light source according to claim 1, wherein the boost regulator circuit maintains substantially the rated operating voltage to the lamp when the battery voltage is greater than approximately half of the initial battery voltage.

3. A light source according to claim 1, wherein the operating voltage maintained by the boost regulator circuit is approximately 80% of the rated operating voltage of the lamp and the initial battery voltage is greater than 80% of the rated operating voltage of the lamp, and wherein the boost regulator circuit is operative to allow the operating voltage to diminish from the initial battery voltage to 80% of the rated operating voltage during an initial portion of the battery operating lifetime.

4. A light source according to claim 1, wherein the rated operating voltage of the lamp is 6 volts, and wherein the batteries are 1.5-volt dry cells.

5. A light source according to claim 1, wherein the boost regulator is a switching regulator having an asynchronous rectifier output.

6. A light source according to claim 1, wherein the boost regulator is a switching regulator having a synchronous rectifier output.

7. A light source according to claim 1, further comprising a circuit board coupled to the lamp and the batteries, the circuit board including a first electrical contact in electrical contact with one of the batteries and a second electrical contact in electrical contact with the lamp, the circuit board also including a common electrical contact connected to a common connection in the light source between the batteries and the lamp, and wherein the boost regulator circuit is disposed on the circuit board and connected to the first, second and common contacts to transfer electrical power from the batteries to the lamp.

8. A circuit assembly for use in a portable light source, the light source having a case containing a lamp and one or more series-connected batteries collectively operative to provide electrical power to the lamp, the circuit assembly comprising:
   a planar circuit board shaped to be disposed within the case of the light source between the lamp and an adjacent one of the batteries, the circuit board including a first electrical contact on one planar surface to make electrical contact with the adjacent battery and a second electrical contact on the other planar surface to make electrical contact with the lamp, the circuit board also including a common electrical contact to be connected to a common connection in the light source between the batteries and the lamp; and
   a regulator circuit arranged on the circuit board, the regulator circuit being connected to the first, second and common contacts and being operative to transfer electrical power from the batteries to the lamp so as to maintain a substantially constant and full output light intensity over a major portion of the battery operating lifetime.

9. A circuit assembly according to claim 8, wherein the batteries are collectively operative to provide electrical power at a battery voltage, the battery voltage generally diminishing during the operating lifetime of the batteries from an initial battery voltage substantially equal to a rated operating voltage of the lamp toward zero volts, and wherein the regulator circuit is a boost regulator circuit operative to automatically maintain substantially the rated operating voltage to the lamp as the battery voltage diminishes.

10. A circuit assembly according to claim 8 for use in a light source in which the common connection extends alongside the lamp and the adjacent battery, wherein the common electrical contact is a flexible contact extending from an edge of the circuit board to contact the common connection.

11. A circuit assembly according to claim 8 for use in a light source having a case with a tubular portion for housing the batteries, wherein the circuit board is shaped as a disk having a sufficiently small diameter to fit within the tubular portion of the case.

\* \* \* \* \*